(12) United States Patent
Leonard et al.

(10) Patent No.: US 8,922,348 B2
(45) Date of Patent: Dec. 30, 2014

(54) RADIO FREQUENCY IDENTIFICATION NOTIFICATION SYSTEM

(71) Applicant: The Boeing Company, Chicago, IL (US)

(72) Inventors: James V. Leonard, St. Charles, MO (US); Aaron L. Eggemeyer, Chester, IL (US); Terrence Halbert, O'Fallon, MO (US); Michael L. Goodall, Bridgeton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/908,653

(22) Filed: Jun. 3, 2013

(65) Prior Publication Data

US 2014/0354418 A1 Dec. 4, 2014

(51) Int. Cl.
*G06K 7/10* (2006.01)

(52) U.S. Cl.
CPC .................................. *G06K 7/10297* (2013.01)
USPC ............... 340/10.41; 340/539.15; 340/539.11

(58) Field of Classification Search
CPC .. H04B 5/0031; H04B 5/0037; H04B 5/0056; H04B 5/0081; H04B 5/02
USPC .............................. 340/10.41, 539.11, 539.15
See application file for complete search history.

(56) References Cited

U.S. PATENT DOCUMENTS 7,336,186 B2 2/2008 Noguchi
7,420,458 B1 * 9/2008 Kuzma et al. ............... 340/10.34
8,223,000 B2 * 7/2012 Shiotsu et al. ............. 340/10.34
8,305,193 B2 11/2012 Horne et al.
8,334,775 B2 12/2012 Tapp et al.
2003/0043023 A1 * 3/2003 Perraud et al. ............... 340/10.1
2010/0148964 A1 6/2010 Broer
2010/0277285 A1 * 11/2010 Anderson et al. ............ 340/10.4
2011/0227726 A1 9/2011 Lee
2012/0088449 A1 4/2012 Norair
2012/0105634 A1 * 5/2012 Meidan et al. ................ 348/143

FOREIGN PATENT DOCUMENTS

GB 2431545 A 4/2007

OTHER PUBLICATIONS

Do you need a hacker-proof wallet?, MSN Money Partner; Aug. 6, 2012; retrieved from the Internet: http://www.money.msn.com/identity-theft/article.aspx?post=9a768899-29b5-4e; (3 pgs).
Andy Pasquesi, How Do Thieves Scan Credit Cards in Your Purse?; retrieved from the Internet: http://www.ehow.com/how-does_5772197_do-scan-credit-cards-purse_html; Jan. 22, 2013; (1 pg).
Extended European Search Report for European Application No. 14160968.5, Date of Mailing: Oct. 14, 2014, (Reference No. P60060EP/CBJ), 7 pages.

* cited by examiner

*Primary Examiner* — Brian Zimmerman
*Assistant Examiner* — Bhavin M Patel
(74) *Attorney, Agent, or Firm* — Toler Law Group, PC

(57) ABSTRACT

A device, such as a radio frequency identification (RFID) device, includes a receiver to receive interrogation signals transmitted over a first frequency band from an RFID reader device. The device includes a transmitter to transmit a notification signal over a second frequency band to a computing device (e.g., a mobile phone) in response to receiving a particular interrogation signal at the receiver. The computing device is distinct from the RFID reader device and the second frequency band is distinct from the first frequency band. The notification signal includes data indicating that the particular interrogation signal was received at the device.

20 Claims, 3 Drawing Sheets

US 8,922,348 B2

RADIO FREQUENCY IDENTIFICATION NOTIFICATION SYSTEM

FIELD

The present disclosure is generally related to radio frequency identification devices.

BACKGROUND

Radio frequency identification (RFID) systems enable RFID devices, such as an RFID reader device, to obtain information (e.g., a tag, a label, or an identifier) stored in an RFID tag via short range, wireless radio frequency communication. Some commercial applications using RFID systems may attach an RFID tag to an object to facilitate tracking and monitoring of the object.

RFID systems may also be used in payment systems. For example, a smart card may include financial information and an RFID transponder. The RFID transponder may provide the financial information to an RFID reader to facilitate a financial transaction. Some such RFID systems may have vulnerabilities. For example, information stored on a smart card including an RFID transponder may be provided to an unauthorized third party (e.g., a criminal) operating an RFID reader device that is capable of communicating with the RFID transponder. The information obtained from the smart card may include personal identification information and bank account information, which may be used for malicious purposes. As a result, businesses, consumers, and governments may spend significant amount of money to prevent and cure the effects of stolen identities and compromised personal and private information.

SUMMARY

Particular embodiments disclosed herein describe a radio frequency (RFID) notification system. The RFID notification system enables one or more notifications (e.g., a message or an audio output), information (e.g., a time, a date, or a geographic location), or both, to be provided by a computing device (e.g., a mobile phone). The notifications, the information, or both, may indicate occurrences of activity at an RFID device, such as an RFID tag device (e.g., an RFID credit card), which stores information (e.g., personal identification information or bank account information). The occurrences of activity at the RFID device may be based on receipt of radio frequency communications (e.g., an interrogation signal) at the RFID device from an RFID reader device. The notifications, the information, or both, may be provided to a monitoring system (e.g., a security system), which may perform one or more actions responsive to the notifications, the information, or both. For example, the monitoring system may control operation of one or more cameras at a geographic location identified based on the notifications, the information, or both.

The notifications provided by the computing device may enable a user of the RFID device to monitor communications received by the RFID device. Additionally, data obtained via one or more cameras operated in response to an occurrence of activity at an RFID device may enable the user to monitor activity in an area associated with unauthorized access of the RFID device. Monitoring activity within an area surrounding the RFID device may aid in apprehension of a third party using an RFID reader device to access information from the RFID device without authorization.

To identify the occurrences of activity at the RFID device, the RFID device may be configured to transmit a radio frequency communication (e.g., a notification signal) to the computing device in response to receiving an RFID interrogation signal from an RFID reader device. The radio frequency communication transmitted to the computing device may include data indicating that the RFID interrogation signal was received at the RFID device. Based on the radio frequency communication received from the RFID device, the computing device may determine a time, a date, or both, when the RFID device was accessed based on when the computing device received the radio frequency communication from the RFID device. The computing device also may determine a geographic location indicating where activity at the RFD device occurred (e.g., using a global positioning system). The computing device may generate a notification of the activity occurring at the RFID device based on the information determined at the computing device in response to receiving the radio frequency communications from the RFID device.

In a particular embodiment, a device (e.g., an RFID transponder) includes a receiver to receive interrogation signals transmitted over a first frequency band from an RFID reader device. The device includes a transmitter to transmit, in response to receiving a particular interrogation signal at the receiver, a notification signal over a second frequency band to a computing device (e.g., a mobile phone). The computing device is distinct from the RFID reader device and the second frequency band is distinct from the first frequency band. The notification signal includes data indicating that the particular interrogation signal was received at the device.

In a particular embodiment, a method includes receiving, at a receiver of an RFID device, an interrogation signal transmitted over a first frequency band from an RFID reader device. The method further includes, in response to receiving the interrogation signal, transmitting, from the RFID device, a notification signal over a second frequency band to a computing device. The computing device is distinct from the RFID reader device and the second frequency band is distinct from the first frequency band. The notification signal includes data indicating that interrogation signal was received at the RFID device.

In another particular embodiment, a computer readable medium stores instructions that, when executed by a processor, cause the processor to receive, at a computing device, a notification signal over a second frequency band from an RFID device. The notification signal is transmitted from the RFID device in response to receipt of an interrogation signal by the RFID device. The interrogation signal is transmitted over a first frequency band from an RFID reader device. The second frequency band is distinct from the first frequency band. The notification signal includes data indicating that the interrogation signal was received at the RFID device. The instructions are further executable by the processor to, in response to receiving the notification signal, determine information associated with the RFID device. The information indicates a geographic location of the computing device when the notification signal was received at the computing device.

The features, functions, and advantages that have been described can be achieved independently in various embodiments or may be combined in yet other embodiments, further details of which are disclosed with reference to the following description and drawings.

DETAILED DESCRIPTION

Figure 1:
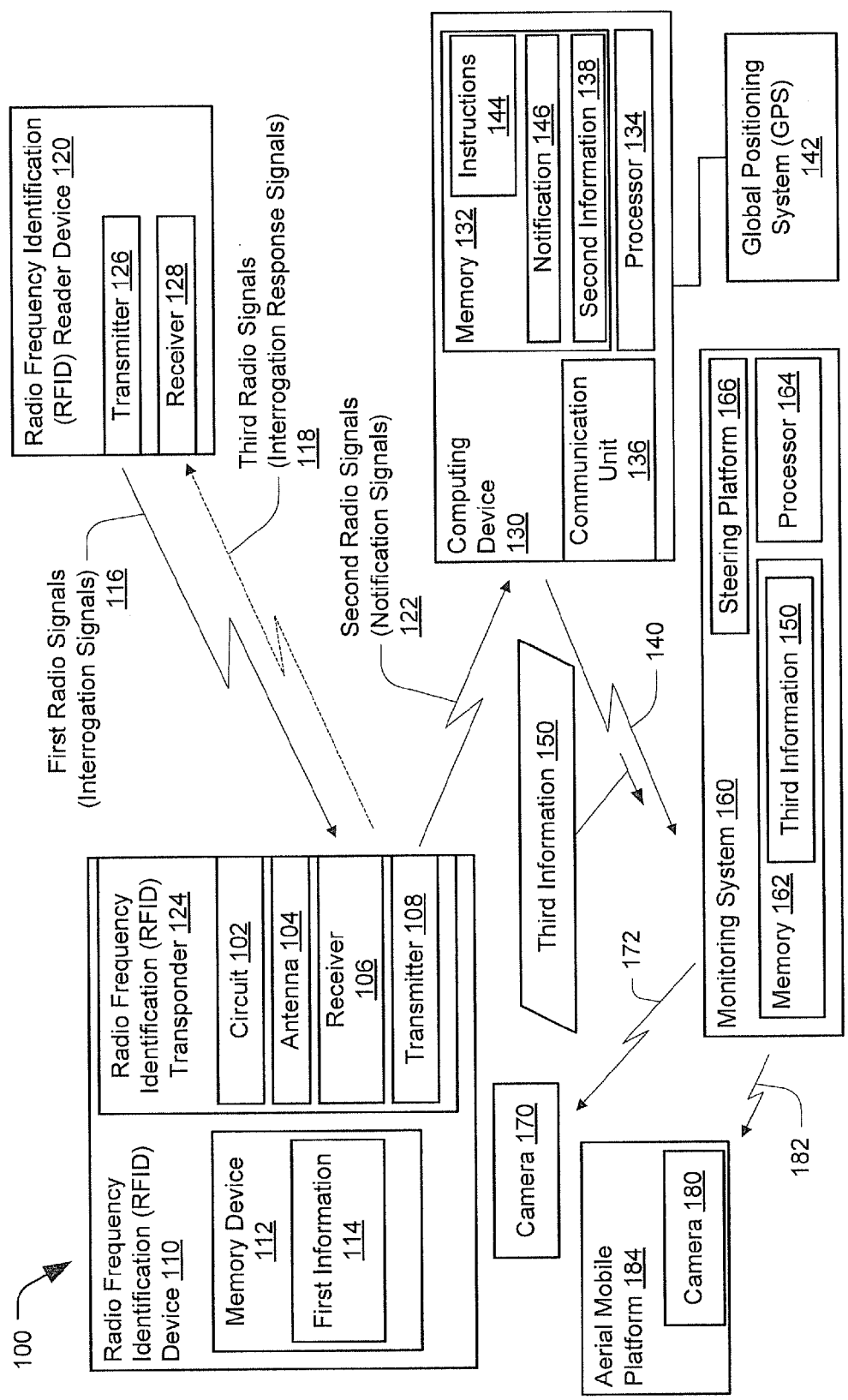
FIG. 1 is a block diagram of a radio frequency identification (RFID) notification system.

Referring to FIG. 1, a block diagram of a radio frequency identification (RFID) notification system 100 is shown. The RFID notification system 100 may facilitate detection of attempts to access information (e.g., personal information, or financial information) from a smart card (e.g., a credit card or a debit card) or another RFID enabled device. A notification may enable identification of an authorized and/or an unauthorized attempt to access the smart card. As use of smart cards that store information and that support RFID communications to facilitate transactions become more common, such information may be more accessible to thieves who have learned to access information from a smart card without an owner of the smart card having knowledge or having provided authorization. One way a third party may scan information from a smart card is by using an RFID interrogation device (also referred to as an RFID reader device 120) in a public area within a communicative distance of the smart card. Such an RFID reader device 120 may be programmed to periodically transmit RFID interrogation signals (such as a first radio signal 116) and to gather and store responses (e.g., interrogation response signals such as a third radio signal 118) that are received from the smart card. Such interrogation response signals may include financial information or other personal information that is stored on smart cards in the public area.

To facilitate identification and/or apprehension of individuals engaged in gathering information in this manner, the RFID notification system 100 may include an RFID device 110. The RFID device 110 may be a smart card that is modified or configured in a manner that enables the RFID notification system 100 to identify attempts to scan the smart card in a particular area. For example, the RFID device 110 may include an RFID transponder 124. The RFID transponder 124 may be configured to receive RFID interrogation signals, such as the first radio signal 116, and to transmit a notification signal (such as a second radio signal 122), which indicates that an attempt was made to access information (e.g., first information 114) from the RFID device 110.

In a particular embodiment, the RFID interrogation signals are received at the RFID device 110 in a first frequency band, and the notification signals 122 are transmitted from the RFID device 110 in a second frequency band that is different from the first frequency band. For example, the first frequency band may be used for RFID communications that support an RFID protocol using frequencies in a ultra-high frequency (UHF) frequency range, such as a range of approximately from 860 MHz to 960 MHz. The second frequency band may be used for data communications that support frequencies in a range that is approximately from 300 MHz to 3000 MHz. The second frequency band may support communications using a communication protocol that includes a personal area network communication protocol, a wireless local area network protocol, a cellular communication protocol, or a combination thereof. The personal area network protocol may include protocols such as a Bluetooth® communication protocol (Bluetooth® is a registered trademark of Bluetooth SIG, Inc.) or an infrared data communication protocol. The wireless local area network protocol may include a wireless communication protocol supported by one of the Institute of Electrical and Electronics Engineers (IEEE) 802.11 wireless communication standards. The cellular communication protocol may include code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), general packet radio service (GPRS), 3rd generation partnership project (3GPP), 3GPP2, 4th generation (4G), long term evolution (LTE), 4G-LTE, or a combination thereof.

The notification signal 122 may be received by a computing device 130 (e.g., a mobile phone) that is located in close proximity to the RFID device 110 such that a user of the computing device 130 may receive a notification indicating an attempt to access the RFID device 110. For example, the computing device 130 may be portable such that the computing device 130 is carried by the user who is also carrying the RFID device 110. As such, the user may carry both the RFID device 110 and the computing device 130 when walking through the public area.

The computing device 130 may determine information (e.g., second information 138) related to an occurrence of activity at the RFID device 110, such as an attempt by the RFID reader device 120 to obtain the information 114 from the RFID device 110. The second information 138 determined by the computing device 130 may indicate a time, a physical location of the computing device 130 (e.g., a geographic location), or both, when the notification signal 122 was received at the computing device 130. The computing device 130 may provide a notification of the attempt to access the RFID device 110 by generating a display that includes the second information 138 (e.g., a message indicating the time and the physical location), by providing an audio alert, or by causing vibration of the computing device 130.

Additionally, or in the alternative, the computing device 130 may send communications to a security monitoring system (e.g., the monitoring system 160) to notify the monitoring system of the attempt to access the RFID device 110 and to provide information (e.g., third information 150) related to the attempt. The third information 150 may include the second information 138 determined by the computing device 130, instructions for controlling operating of the monitoring system 160, other information, or a combination thereof.

The monitoring system 160 may control a surveillance system that includes cameras, such as a camera 170 and a camera 180, to gather additional information related to the attempt to access the RFID device 110. For example, the monitoring system 160 may operate the cameras 170, 180 to gather data (e.g., video data) in area within a vicinity of the geographic location where the attempt to access the RFID device 110 occurred. The data may be useable to apprehend a person operating the RFID reader device 120. In particular embodiments, the camera 180 may be mobile. For example, the camera 180 may be mounted on a mobile platform, such as an aerial mobile platform (e.g., a quadcopter). When mobile, the camera 180 may be movable to a position that is closer to an area where the RFID device 110 may have been accessed such that data may be gathered about individuals in the area.

In a particular embodiment, the RFID device 110 may include the RFID transponder 124 and a memory device 112. The RFID transponder 124 may include a circuit 102 and communication circuitry, including an antenna 104, a receiver 106 and a transmitter 108. The antenna 104 may include or be coupled to the receiver 106 and the transmitter 108. The memory device 112 may include non-volatile memory. The memory device 112 may be configured to store information (e.g., the first information 114). The first information 114 may include identification information (e.g., a tag, a label, or an identifier) to identify the RFID device 110 or an object associated with, attached to, or including the RFID device 110. The first information 114 may include personal identification information, bank account information, travel identification, government identification, information that is associated with an object attached to, associated with, or including the RFID device 110, information that is associated with a user of the RFID device 110, or a combination thereof.

The circuit 102 may be coupled to the memory device 112. The circuit 102 may include or be included within an integrated circuit. The antenna 104 may be coupled to the circuit 102. The circuit 102 may be configured to store, process, or both, the first information 114 stored in the memory device 112. Further, the circuit 102 may be configured to control operation of the antenna 104, the receiver 106, and the transmitter 108. For example, the circuit 102 may perform modulation and demodulation of radio frequency signals at the antenna 104. In a particular embodiment, the RFID device 110 may include a chip (e.g., a microchip) in which the circuit 102 and the memory device 112 may be integrated. In other particular embodiments, the RFID device 110 may include an inlay with a substrate film onto which the antenna 104 and the chip including the memory device 112 and the circuit 102 are mounted or attached.

The RFID device 110 may be configured to communicate with an RFID interrogation device (e.g., the RFID reader device 120), the computing device 130, or both, via the antenna 104. For example, the receiver 106 may receive the first radio signals 116, such as an RFID interrogation signal transmitted from the RFID reader device 120 to obtain the first information 114 stored at the RF1D device 110. The transmitter 108 may transmit the second radio signals 122, such as a notification signal, to the computing device 130. The notification signal 122 may include data indicating an occurrence of activity at the RFID device 110 based on receipt of the first radio signal 116 at the RFID device 110. The data included in the notification signal 122 may include at least a portion of the first information 114 (e.g., an identifier of the RFID device 110).

In a particular embodiment, the RFID reader device 120 sends the interrogation signal 116 the RFID device 110 in the first frequency band using an RFID communication protocol. In response to receiving the interrogation signal 116, the RFID device 110 sends the notification signal 122 in the second frequency band using a communication protocol (e.g., a cellular communication protocol) that is distinct from the RFID communication protocol. The second frequency band is distinct from the first frequency band. In this embodiment, the RFID reader device 120 may not be configured to receive communications, such as the notification signal 122, transmitted in the second frequency band using the communication protocol that is distinct from the RFID communication protocol. Thus, transmitting the notification signal 122 in the second frequency band using a distinct communication protocol may prevent the user (e.g., a thief) of the RFID reader device 120 from receiving the notification indicating that the RFID device 110 was accessed.

In a particular embodiment, the transmitter 108 may also transmit the third radio signals 118, such as an RFID interrogation response signal, to the RFID reader device 120. The interrogation response signal 122 may be transmitted in response to receipt of the first radio signal 116 at the RFID device 110. The third radio signals 118 may be transmitted to provide all or a portion of the first information 114 stored at the RFID device 110. Thus, the RFID device 110 may function as a smart card to transmit the information 114 in response to receiving the interrogation signal 116 and to alert a user that the interrogation signal 116 was received. In an alternate embodiment, the REID device 110 does not respond to RFID reader device 120 by transmitting the interrogation response signal 118.

The RFID device 110 may be configured to operate as a passive RFID device or active RFID device. When the RFID device 110 operates as a passive RFID device, the RFID device 110 may obtain power for operation from energy provided by an electromagnetic energy field transmitted via the first radio signals 116. In a particular embodiment, when the RFID device 110 operates as a passive RFID device, the transmitter 108 may transmit the second radio signal 122, the third radio signal 118, or both, in response to receiving the first radio signal 116 using energy derived from the first radio signal 116. When the RFID device 110 operates as an active RFID device, the RFID device 110 may obtain power for operation from energy supplied by power sources, such as a battery integral with or coupled to the RFID device 110.

The RFID reader device 120 may be configured to communicate with devices that use RFID communications, such as an RFID tag, an RFID transponder, a smart card, or the RFID device 110. The RFID reader device 120 may include a transmitter 126 and a receiver 128. The transmitter 126 may be configured to transmit the first radio signals 116 to the RFID device 110 to obtain the first information 114. The receiver 128 may be configured to receive the third radio signals 118 from the RFID device 110. The third radio signal 118 may contain information (e.g., the first information 114) stored at the RFID device 110. The RFID reader device 120 may display or store the first information 114 for to perform an activity based on the first information. For example, the first information 114 may be used to perform an unauthorized financial transaction.

The computing device 130 may include a communications unit 136 that is configured to receive communications from RFID devices, such as the RFID device 110. For example, the communications unit 136 may be configured to receive the second radio signals 122 from the RFID device 110. The communications unit 136 may be configured to send communications to monitoring systems, such as the monitoring system 160, via a data communication connection 140. The data communication connection 140 may be implemented as a wired data communication or a wireless data communication.

In a particular embodiment, the computing device 130 includes or is included within a mobile communication device (e.g., a mobile phone or a smart phone), a mobile computing device (e.g., a tablet computing device or a personal digital assistant device), or a personal computer. The computing device 130 may include a processor 134 and a memory 132 that is accessible to the processor 134. The memory 132 may store instructions 144 that are executable by the processor 134 to perform one or more operations described herein. The instructions 144 may be included in one or more computer program products, one or more computer software applications (e.g., mobile phone applications), program code, or a combination thereof, stored in the memory 132. The memory 132 may store information (e.g., the second information 138), a notification (e.g., the notification 146), or both, determined by the computing device 130. The second information 138, the notification 146, or both, may provide an indication of activity that occurred at the RFID device 110. Additionally, or in the alternative, the computing device 130 may store the second information 138, the notification 146, or both, in a storage device (e.g., a database, a network memory device, or a server) associated with or accessible to the computing device 130.

The computing device 130 may determine the second information 138 based on the notification signal 122 received from the RFID device 110. The second information 138 may indicate a time, a date, or both, when the second radio signal 122 was received at the computing device 130. The second information 138 may indicate a physical location of the computing device 130 at which the notification signal 122 was received at the computing device 130. The physical location may be a geographic location that corresponds to an area where activity at the RFID device 110 occurred. In a particular embodiment, the physical location may be determined based on information provided by a global positioning system (GPS) 142 integral with or coupled to the computing device 130.

The computing device 130 may generate a display that provides the second information 138 related to the occurrence of the activity at the RFID device 110. The computing device 130 may also generate a display that includes an analysis (e.g., trends, patterns, comparisons, or a combination thereof) of a plurality of occurrences of activity at the RFID device 110 based on the second information 138 determined for a plurality of second radio signals 122. The computing device 130 may present the display at a display device associated with the computing device 130. The computing device 130 may provide a notification, such as the notification 146 (e.g., a message or an audio output), identifying the occurrence of the activity at an RFID device 110. The notification 146 may be determined based on the notification signal 122, the second information 138, or both. The notification 146 may be displayed as a message at the display device.

In a particular embodiment, the computing device 130 may be configured to send, to the monitoring system 160 via the data communication connection 140, a communication including information (e.g., third information 150) related to the occurrence of the activity at the RFID device 110. The third information 150 may include the notification 146, the second information 138, or both. The third information 150 may also include instructions to control operation of the monitoring system 160. For example, the instruction may indicate how the monitoring system 160 is to control operation of a camera (e.g., the camera 170 or the camera 180) at a geographic location identified based on the second information 138. Data (e.g., video data, audio data, or both) obtained via the cameras 170, 180 may enable the user to monitor activity in an area associated with the geographic location where an activity at the RFID device 110 may have occurred.

The monitoring system 160 may include a processor 164 and a memory 162 that is accessible to the processor 164. The memory 162 may include instructions that are executable by the processor 164 to perform operations described herein. The monitoring system 160 may be configured to receive communications from computing devices, such as the computing device 130. For example, the monitoring system 160 may receive a communication including the third information 150 from the computing device 130 via the data communication connection 140. The memory 162 may store information, such as the third information 150.

The monitoring system 160 may be configured to control operation of a camera, such as the camera 170 or the camera 180. Either or both of the cameras 170, 180 may be operated in response to the communication received from the computing device 130. The monitoring system 160 may operate the camera 170 and the camera 180 by sending a communication including instructions to the camera 170 and the camera 180 via the data communication connection 172 and the data communication connection 182, respectively. Either or both of the cameras 170,180 may include a mobile camera, a video camera, a security camera, or a combination thereof. In a particular embodiment, the camera 180 may be mounted on a mobile platform, such as an aerial mobile platform 184. For example, the camera 180 may be mounted on a quadcopter, or any other unmanned or manned aerial vehicle. The monitoring system 160 may also include steering platform 166 to steer the aerial mobile platform 184 in a particular area associated with a geographic location. The monitoring system 160 may communicate with the aerial mobile platform 184 via the data communication connection 182.

In a particular embodiment, the monitoring system 160 may be associated with or implemented in a security system. A user associated with the monitoring system 160 may be distinct from a user associated with the computing device 130. The monitoring system 160 may be located at a geographic location that is distinct from a geographic location of the computing device 130. In particular embodiments, the monitoring system 160 may be associated with the computing device 130. For example, the monitoring system 160 may be portable such that the monitoring system 160 may be carried by a user of the computing device 130. The monitoring system 160 may provide a notification (e.g., a message, a video output, an audio output, or a combination thereof) based on the third information 150 received from the computing device 130. The monitoring system may also provide a display of all or a portion of the third information 150.

During operation, a first user of the RFID reader device 120 may operate the RFID reader device 120 to interrogate the RFID device 110 to obtain at least a portion of the first information 114 stored on the RFID device 110. To obtain the portion of the first information 114, the RFID reader device 120 may transmit the first radio signal 116 (e.g., an interrogation signal) to the RFID device 110. The RFID device 110 may be associated with or operated by a second user. For example, the first user may be a thief who does not have authorization to access the first information 114 and attempts to gather the first information 114 (e.g., personal identification information and bank account information associated with the second user) from the RFID device (e.g., a credit card). The thief may operate the RFID reader device 120 in a public area by causing the RFID reader device 120 to periodically transmit the interrogation signal 116 to the RFID device 110 to obtain the first information 114. In another example, the first user may be a sales agent, or an automated check-out, or purchase, system, of a business who has authorization from the second user to access the first information 114 (e.g., bank account information) from the RFID device 110 to perform a transaction at the business. The sales agent may operate the RFID reader device 120 at an establishment of the business by causing the RFID reader device 120 to transmit the interrogation signal 116 to obtain the first information 114.

In a particular embodiment, the interrogation signal 116 may be transmitted over a first frequency band from the RFID reader device 120 to the RFID device 110. The first frequency band may support communication using one or more RFID protocols using frequencies in a range that is approximately from 300 MHz to 3000 MHz. In a particular embodiment, the first frequency band may support UHF communications in a range that is approximately from 860 MHz to 960 MHz. In other particular embodiments, the first frequency band may include frequencies in lower frequency ranges, such as very low frequency (VLF) having a frequency range of 3 kHz to 30 kHz, low frequency (LF) having a frequency range of 30 kHz to 300 kHz, high frequency (HF) having a frequency range of 3 MHz to 30 MHZ, or a combination thereof. Different portions of the radio frequency spectrum may be selected based on radio transmission technologies, protocols, applications, and range of communication. Some frequencies in the first frequency band may be regulated by a government entity or regulated by licensing restrictions of private communication operators.

In response to receiving the interrogation signal 116, the RFID device 110 may transmit the second radio signal 122 (e.g., a notification signal) over the second frequency band to the computing device 130. The notification signal 122 transmitted to the computing device 130 may include data indicating an occurrence of activity at the RFID device 110, such as when that the interrogation signal 116 was received at the RFID device 110. In a particular embodiment, the RFID device 110 may receive power to transmit the notification signal 122 based on energy derived from the interrogation signal 116.

The second frequency band may support communication using one or more RFID protocols that use frequencies in a range that is approximately from 300 MHz to 3000 MHz. In other particular embodiments, the second frequency band may support communication using one or more other communication protocols including a personal area network communication protocol, a wireless local area network protocol, a cellular communication protocol, or a combination thereof. The personal area network protocol may include protocols such as the Bluetooth® communication protocol or an infrared data communication protocol. The wireless local area network protocol may include a wireless communication protocol supported by one of the IEEE 802.11 wireless communication standards. The cellular communication protocol may include CDMA, TDMA, FDMA, OFDMA, SC-FDMA, GSM, EDGE, evolved EDGE, UMTS, GPRS, 3GPP, 3GPP2, 4G, LTE, 4G-LTE, or a combination thereof. The second frequency band may be selected based on radio transmission technologies, protocols, applications, and range of communication. Some frequencies in the second frequency band may be regulated by a government entity or regulated by licensing restrictions of private communication operators.

In a particular embodiment, the second frequency band may be distinct from the first frequency band. For example, the first frequency band may support an RFID communication protocol, and the second frequency band may support a distinct communication protocol, such as a cellular communication protocol. In this example, the first frequency band may have a range that is approximately from 860 MHz to 960 MHz used for the RFID communication protocol, and the second frequency band may include frequencies used for a cellular communication protocol supported by a particular communications carrier. Transmission of the notification signal 122 over the second frequency band may enable the computing device 130 to receive the information related to the occurrence of an activity at the RFID device 110 when the computing device 130 is not accessible to the user of the RFID device 110. For example, the computing device 130 may be at a remote location where the computing device 130 receives the notification signal 122.

In a particular embodiment, the RFID reader device 120 may be configured to receive the interrogation signal 116 in the first frequency band and may not be configured to receive the notification signal 122 in the second frequency band, which is distinct from the first frequency band. In this embodiment, the RFID reader device 120 may be configured to communicate using an RFID communication protocol, which may not support other communication protocols that use radio frequencies outside of a range of the first frequency band. Thus, the RFID reader device 120 may not receive or detect the notification signal 122.

In response to receiving the interrogation signal 116, the RFID device 110 may transmit the third radio signal 118 (e.g., an interrogation response signal) over a third frequency band to the RFID reader device 120. The RFID device 110 may receive power to transmit the interrogation response signal 118 using energy derived from the interrogation signal 116. The third frequency band may support communications using one or more RFID protocols that use frequencies in a range that is approximately from 300 MHz to 3000 MHz. In a particular embodiment, the third frequency band may support one or more of frequencies included in the first frequency band.

The interrogation response signal 118 transmitted to the RFID reader device 120 may include at least a portion of the first information 114 stored at the RFID device 110. For example, the interrogation response signal 118 may include an identifier of the RFID device and may not include other information stored at the RFID device 110, such as personal identification information, bank account information, government identification information, account information, or a combination thereof. In particular embodiments, the RFID device 110 may prohibit transmitting the interrogation response signal 118 in response to receiving the interrogation signal 116. Prohibiting transmission of the interrogation response signal 118 may prevent an unauthorized third party from obtaining the first information 114 by the RFID reader device 120.

The computing device 130 may determine second information 138 based on when the notification signal 122 is received by the computing device 130. For example, the second information 138 may indicate a time, a date, or both, when the notification signal 122 was received at the computing device 130. An indication that the notification signal 122 was received may indicate that the RFID device 110 received the interrogation signal 116, the receipt of which caused the RFID device 110 to transmit the notification signal 122. In another example, the second information 138 may indicate a physical location at which the notification signal 122 was received by the computing device 130. The physical location may be proximate to a geographic location where activity at the RFID device 110 may have occurred, causing the RFID device 110 to transmit the notification signal 122. Additionally, or in the alternative, the physical location may be associated with or correspond to a landmark, a business address, a residential address, a name of a business, a geographic location (e.g., global position coordinates), or a combination thereof. In a particular embodiment, the physical location may be a geographic location based on information (e.g., global position coordinates) provided by the global positioning system (GPS) 142 associated with the computing device 130.

The computing device 130 may generate a display including at least a portion of the second information 138, which is presented at a display device associated with the computing device 130. The portion of the second information 138 presented in the display may indicate an occurrence of activity at the RFID device 110. To illustrate, the computing device 130 may present information indicating a time and a date corresponding to when the notification signal 122 was received. In another example, the computing device 130 may present a geographical map that indicates the physical location at which the notification signal 122 was received. The computing device 130 may also determine an analysis (e.g., trends, patterns, comparisons, or a combination thereof) of activity at the RFID device 110 based on the second information 138. In a particular embodiment, the display generated by the computing device may include the analysis (trends, patterns, comparisons, or a combination thereof) of a plurality of activities that occurred at the RFID device 110. The analysis may be determined based on the second information 138. For example, the display may include a chart illustrating a pattern of a time period when multiple notification signals 122 were received within a vicinity of a particular physical location. The chart may be useful in determining whether unauthorized access of the first information 114 may have been obtained at the particular physical location during a particular time.

In response to receiving the notification signal 146, the computing device 130 may provide the notification 146 to a user of the computing device 130. For example, the notification 146 may be a message presented at the display device with information (e.g., a time, a date, or an address of the computing device 130 when the notification signal 122 was received by the computing device 130). The computing device 130 may communicate the third information 150 to the monitoring system 160 via the data communication connection 140 in response to receiving the notification signal 122. The third information 150 may indicate an occurrence of activity at the RFID device 110. The third information 150 may include at least a portion of the second information 138, the notification 146, the analysis of the plurality of activities that occurred at the RFID device 110, or a combination thereof. In a particular embodiment, the third information 150 may include instructions to control operation of the monitoring system 160. For example, the third information 150 may include an instruction to direct each or both of the cameras 170, 180 within a vicinity of the physical location identified based on the notification signal 122.

The monitoring system 160 may operate either or both of the cameras 170, 180 in response to receiving the third information 150. For example, the camera 170 and the camera 180 may be operated at an area within proximity of the physical location (e.g., a geographic location) of the computing device 130 indicated in the third information 150. In a particular embodiment, the steering platform 166 may communicate an instruction to the aerial mobile platform 184 via the data communication connection 182 to steer the aerial mobile platform 184 within proximity of the physical location of the computing device 130. The monitoring system 160 may control operation of the camera 180 to obtain data when the aerial mobile platform 184 is within a vicinity of the physical location.

The monitoring system 160 may provide the notification 146 included in the third information 150 to a user of the monitoring system 160. For example, the notification 146 may be displayed at the monitoring system 160 to indicate an occurrence of activity at the RFID device 110 based on the notification signal 122. In another example, the notification 146 may be presented an audio alert at the monitoring system 160. The monitoring system may provide a display that includes all or a portion of the third information 150. For example, the display may indicate when the second radio signal 122 was received at the computing device 130. In another example, the display may present a geographical map that identifies the physical location corresponding to the second radio signal 122 received at the computing device 130. The information provided in the display may assist a user of the monitoring system 160 to determine where activity at the RFID device 110 may have occurred. Such information may enable the user to determine when and where to control operation of either or both of the cameras 170, 180 to obtain data (e.g., video data, audio data, or both). The data may be useful in identifying unauthorized activity in an area surrounding the RFID device 110.

The RFID notification system may enable a user of an RFID device (e.g., a smartcard) to use a computing device, such as a mobile phone, to monitor or track any communications received at the RFID device based on a notification signal that is received by a computing device. The notification signal may further enable the computing device to provide information, a notification, or both, which may indicate where (e.g., a geographic location) and when (e.g., a time and a date) activity may have occurred at the RFID device. Based on such information and a notification, the user of the RFID device may be able to identify an attempt by a third party (e.g., a thief) to gain unauthorized access to private information stored on the RFID device. The RFID notification system further enables a monitoring system to obtain data (e.g., audio or video data) within an area of the geographic location where activity occurred at the RFID device. The audio and video data may aid in apprehension of a third party who may have accessed information from the RFID device without authorization.

Figure 2:
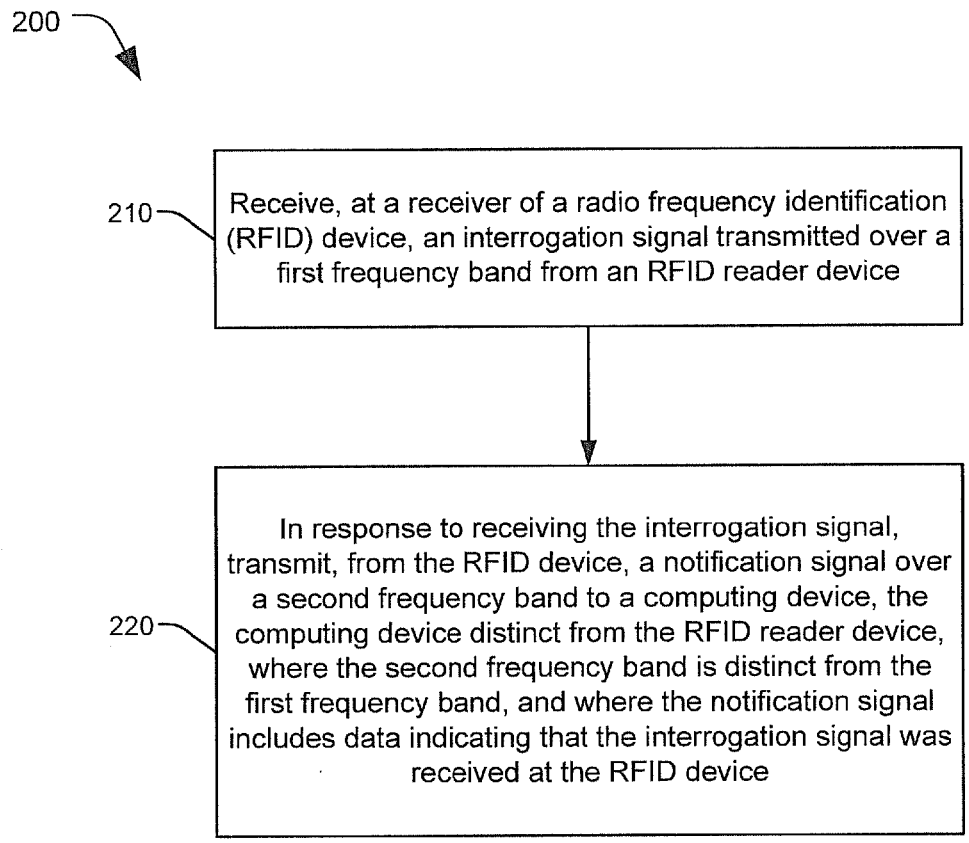
FIG. 2 is a flow diagram of a particular embodiment of a method performed by an RFID notification system.

In FIG. 2, a flow diagram of a particular embodiment of a method 200 performed by an RFID notification system is shown. The method 200 may be performed by the RFID device 110 of the RFID notification system 100 of FIG. 1.

At 210, the method 200 includes receiving, at a receiver of an RFID device, an interrogation signal transmitted over a first frequency band from an RFID reader device. For example, the receiver 106 of the RFID device 110 of FIG. 1 may receive an interrogation signal 116 transmitted over a first frequency band from the RFID reader device 120.

At 220, the method 200 includes, in response to receiving the interrogation signal, transmitting, from the RFID device, a notification signal over a second frequency band to a computing device. The computing device is distinct from the RFID reader device, and the second frequency band is distinct from the first frequency band. The notification signal includes data indicating that the interrogation signal was received at the RFID device. For example, in response to receiving an interrogation signal 116 of FIG. 1, the transmitter 108 of the RFID device 110 may transmit a notification signal 122 over a second frequency band to the computing device 130. The computing device 130 is distinct from the RFID reader device 120, and the second frequency band is distinct from the first frequency band. The notification signal 122 includes data indicating that the interrogation signal 116 was received at the RFID device 110.

Figure 3:
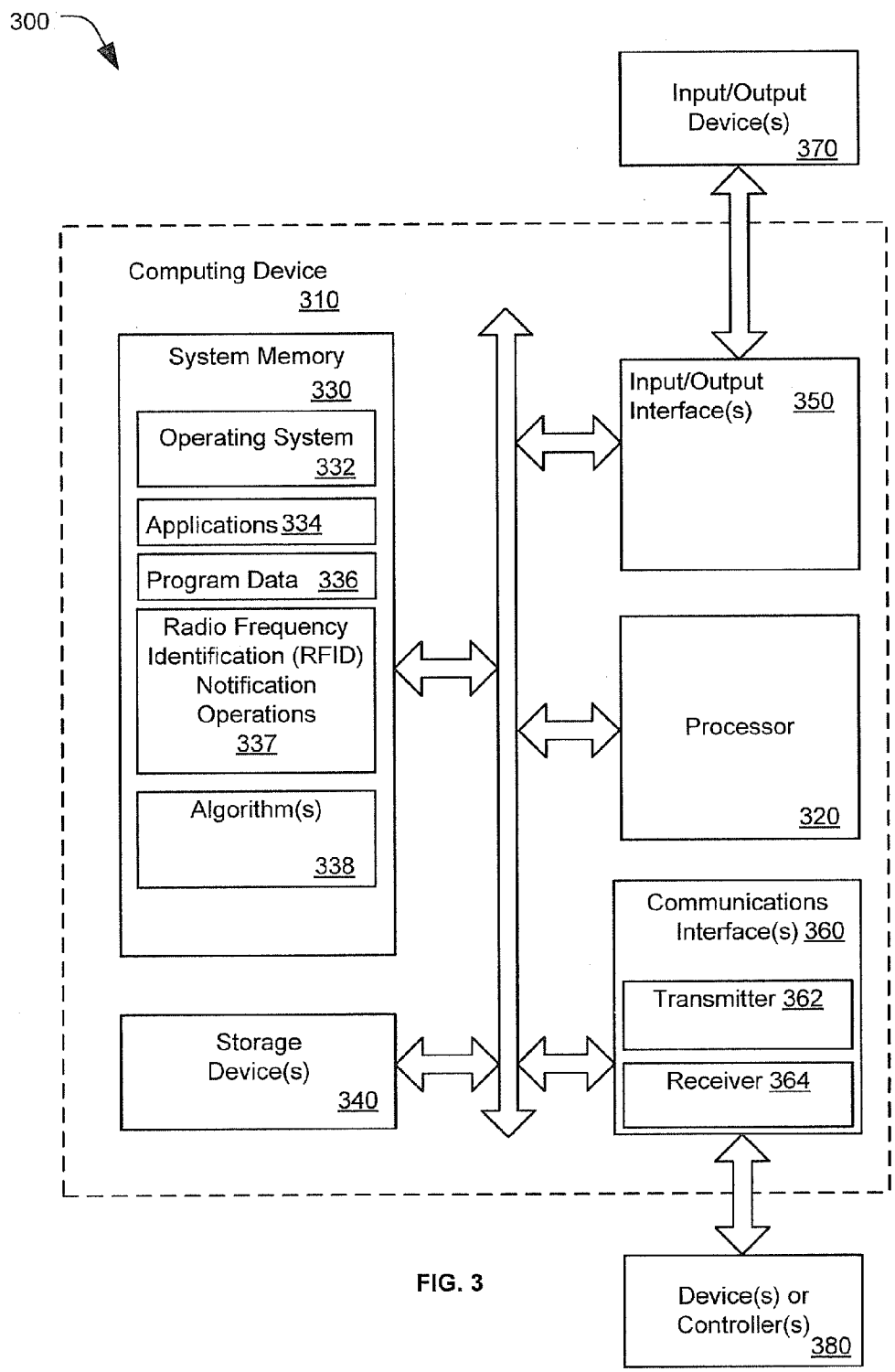
FIG. 3 illustrates a particular embodiment of a computing system that may be used to implement one or more aspects of the disclosure.

FIG. 3 is a block diagram of a computing environment 300 including a general purpose computing device 310 operable to support communications. For example, the computing device 310, or portions thereof, may correspond to the RFID device 110 of FIG. 1, RFID reader device 120 of FIG. 1, the computing device 130 of FIG. 1, or the monitoring system 160 of FIG. 1.

The computing device 310 may include at least one processor 320. Within the computing device 310, the at least one processor 320 may communicate with a system memory 330, one or more storage devices 340, one or more input/output interfaces 350, one or more communications interfaces 360, or a combination thereof.

The system memory 330 may include volatile memory devices (e.g., random access memory (RAM) devices), non-volatile memory devices (e.g., read-only memory (ROM) devices, programmable read-only memory, and flash memory), or both. The system memory 330 may include an operating system 332, which may include a basic input/output system for booting the computing device 310 as well as a full operating system to enable the computing device 310 to interact with users, other programs, and other devices. The system memory 330 may also include one or more applications 334, program data 336, radio frequency identification (RFID) notification operations 337, and algorithm(s) 338. For example, the RFID notification operations 337 may include one or more operations described herein as being performed by the RFID device 110 of FIG. 1, the RFID reader device 120 of FIG. 1, the computing device 130 of FIG. 1, the monitoring system 160 of FIG. 1, or a combination thereof. The RFID notification operations 337 may include one or more operations performed by the RFID device 110 of FIG. 1, the computing device 130 of FIG. 1, or the monitoring system 160 of FIG. 1. The algorithms 338 may include instructions that are executable to perform the methods described herein, such as the method 200. The program data 336 may include data used by the applications 334 to perform respective functions of the applications 334.

The at least one processor 320 may also communicate with one or more storage devices 340. For example, the one or more storage devices 340 may include nonvolatile storage devices, such as magnetic disks, optical disks, or flash memory devices. The storage devices 340 may include both removable and non-removable memory devices. The storage devices 340 may be configured to store an operating system, applications and program data. In a particular embodiment, the system memory 330, the storage devices 340, or both, include tangible, non-transitory computer-readable media. The storage devices 340 may store data used by one or more of the applications 334.

The at least one processor 320 may also communicate with one or more input/output interfaces 350. The input/output interface 350 may include the input interface 352. The one or more input/output interfaces 350 may enable the computing device 310 to communicate with one or more input/output devices 370 to facilitate user interaction. For example, the one or more input/output interfaces 350 may be adapted to receive input from the user, to receive input from another computing device, or a combination thereof. The input/output interfaces 350 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 370 may include user interface devices and displays, including some combination of buttons, keyboards, pointing devices, displays, speakers, microphones, touch screens, and other devices.

The at least one processor 320 may communicate with other computer systems 380 and/or other devices via the one or more communications interfaces 360. The one or more communications interfaces 360 may include wired Ethernet interfaces, IEEE 802 wireless interfaces, Bluetooth communication interfaces, electrical, optical or radio frequency interfaces, infrared interfaces, or other wired or wireless interfaces. The one or more communication interfaces 360 may include a transmitter 362. The transmitter 362 may correspond to the transmitter 108 of FIG. 1, the transmitter 126 of FIG. 1, or a transmitter included in the communications unit 136 of FIG. 1. The one or more communication interfaces 360 may include a receiver 364. The receiver 364 may correspond to the receiver 106 of FIG. 1, the receiver 128 of FIG. 1, or a receiver included in the communications unit 136 of FIG. 1. The other computer systems 380 may include host computers, servers, workstations, portable computers, telephones, tablet computers, or any other communication device or component.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A computing device comprising:
a receiver to receive a notification signal over a second frequency band from a radio frequency identification (RFID) device, wherein the notification signal is transmitted from the RFID device in response to receipt by the RFID device of a particular interrogation signal from a RFID reader device over a first frequency band, the computing device distinct from the RFID reader device, wherein the second frequency band is distinct from the first frequency band, and wherein the notification signal includes data indicating that the particular interrogation signal was received at the RFID device; and
a processor coupled to the receiver, wherein the processor is configured to determine information indicating a geographic location of the computing device, and wherein the processor is configured to send a message to a monitoring system to activate a camera of the monitoring system in an area proximate to the geographic location of the computing device in response to receipt of the notification by the receiver.

2. The computing device of claim 1, wherein receipt of the notification signal by the receiver causes the processor to determine information indicating a time, a date, or both, when the notification signal was received by the receiver.

3. The computing device of claim 1, wherein the monitoring system is distinct from the computing device.

4. The computing device of claim 1 wherein the computing device is a mobile communication device.

5. The computing device of claim 1, wherein the RFID device includes an RFID transponder.

6. The computing device of claim 1, wherein the RFID reader device is configured to receive an interrogation response signal in the first frequency band and is not configured to receive the notification signal in the second frequency band.

7. The computing device of claim 1, wherein the first frequency band is approximately from 860 MHz to 960 MHz.

8. The computing device of claim 1, wherein the second frequency band supports communication using a personal area network communication protocol, a wireless local area network protocol, a cellular communication protocol, or a combination thereof.

9. The computing device of claim 1, wherein the RFID device transmits an interrogation response signal over the first frequency band to the RFID reader device in response to the particular interrogation signal.

10. The computing device of claim 1, wherein receipt of the notification signal by the receiver causes the processor to communicate information to the monitoring system, and wherein the information indicates a time when the notification signal was received at the receiver.

11. The computing device of claim 1, wherein the RFID device transmits the notification signal using energy derived from the particular interrogation signal.

12. A method comprising:
- receiving from a radio frequency identification (RFID) device at a computing device, a notification signal over a second frequency band, wherein the notification signal is transmitted from the RFID device in response to receipt of an interrogation signal by the RFID device from a RFID reader device over a first frequency band, the computing device distinct from the RFID reader device, wherein the second frequency band is distinct from the first frequency band, and wherein the notification signal includes data indicating that the interrogation signal was received at the RFID device;
- in response to receiving the notification signal, determining, via the computing device, information indicating a geographic location of the computing device; and
- sending a message from the computing device to a monitoring system, wherein the monitoring system operates a camera in an area proximate to the geographic location of the computing device in response to receipt of the message.

13. The method of claim 12, wherein the second frequency band supports communication using a personal area network communication protocol, a wireless local area network protocol, a cellular communication protocol, or a combination thereof.

14. The method of claim 12, wherein the RFID reader device is operated by a first user that is distinct from a second user of the RFID device and wherein the first user is not authorized to access information stored at the RFID device.

15. The method of claim 12, wherein the monitoring system is configured to aid in apprehension of an unauthorized RFID reader device user.

16. The method of claim 12, wherein the camera is a security camera that is mounted in a location proximate to the geographic location of the computing device.

17. The method of claim 12, wherein the message further causes the monitoring system to steer an aerial mobile platform including a second camera to the area proximate to the geographic location of the computing device and causes the monitoring system to operate the second camera at the area, and wherein the aerial mobile platform is a quadcopter.

18. A non-transitory computer readable medium storing instructions that, when executed by a processor, cause the processor to perform operations including:
- receiving, at a computing device, a notification signal over a second frequency band from a radio frequency identification (RFID) device, wherein the notification signal is transmitted from the RFID device in response to receipt of an interrogation signal by the RFID device, the interrogation signal transmitted over a first frequency band from an RFID reader device, wherein the second frequency band is distinct from the first frequency band, and wherein the notification signal includes data indicating that the interrogation signal was received at the RFID device;
- in response to receiving the notification signal, determining information that indicates a geographic location of the computing device when the notification signal was received at the computing device; and
- sending a message from the computing device to a monitoring system, wherein the monitoring system operates a camera in an area proximate to the geographic location of the computing device in response to receipt of the message.

19. The non-transitory computer readable medium of claim 18, wherein the information indicates a time, a date, or both, when the notification signal was received at the computing device, and wherein the operation further include displaying a notification based on the information.

20. The non-transitory computer readable medium of claim 18, wherein the second frequency band supports communication using a personal area network communication protocol, a wireless local area network protocol, a cellular communication protocol, or a combination thereof.

* * * * *